United States Patent
Lauder

(10) Patent No.: US 8,310,493 B1
(45) Date of Patent: Nov. 13, 2012

(54) METHOD AND SYSTEM FOR APPLICATION BROADCAST

(75) Inventor: Doug Lauder, Ontario (CA)

(73) Assignee: West Corporation, Omaha, NE (US)

( * ) Notice: Subject to any disclaimer, the term of this patent is extended or adjusted under 35 U.S.C. 154(b) by 0 days.

(21) Appl. No.: 12/562,503

(22) Filed: Sep. 18, 2009

Related U.S. Application Data

(63) Continuation of application No. 10/325,811, filed on Dec. 18, 2002, now Pat. No. 7,616,208.

(51) Int. Cl.
  *G06T 1/60*   (2006.01)
  *G06F 15/16*  (2006.01)
(52) U.S. Cl. ........................................ 345/530; 709/201
(58) Field of Classification Search .................. 709/201, 709/204, 212, 213, 217, 231
  See application file for complete search history.

(56) References Cited

U.S. PATENT DOCUMENTS

| | | | |
|---|---|---|---|
| 4,958,378 A | 9/1990 | Bell | |
| 6,199,116 B1 | 3/2001 | May et al. | |
| 6,323,860 B1 * | 11/2001 | Zhu et al. | 345/427 |
| 2002/0015042 A1 * | 2/2002 | Robotham et al. | 345/581 |
| 2003/0058248 A1 | 3/2003 | Hochmuth et al. | |
| 2003/0202575 A1 * | 10/2003 | Williams et al. | 375/240.01 |
| 2003/0227565 A1 | 12/2003 | Hamilton et al. | |

FOREIGN PATENT DOCUMENTS

| | | |
|---|---|---|
| EP | 0669764 A1 | 8/1995 |
| JP | 2002156894 | 5/2002 |
| JP | 2002297486 A | 10/2002 |
| WO | WO0195617 A2 | 12/2001 |

* cited by examiner

*Primary Examiner* — Jacinta M Crawford

(57) ABSTRACT

Methods and apparatuses are described for application broadcasting. For one embodiment, pixel data being broadcast from a moderator to one or more participants is divided into tiles. Display data is generated for each tile. Each display data segment (segment) contains the pixel data for the tile, and also contains a tile identifier. The segments are periodically evaluated. If the pixel data has changed, the segment is replaced with the most recent segment corresponding to that tile. A time indicator is also included within each segment for each tile indicating the time at which the segment was updated. A participant DPS requests data from the server and provides the time indicator for the last segment it received. The server then transmits the current segment for each tile that has been updated subsequently. This allows presentation at the participant's DPS of the most current version of the moderator's display screen.

19 Claims, 6 Drawing Sheets

METHOD AND SYSTEM FOR APPLICATION BROADCAST

CROSS-REFERENCE TO RELATED APPLICATIONS

The present patent application is a continuation of and claims priority from patent application Ser. No. 10/325,811, titled A METHOD AND SYSTEM FOR APPLICATION BROADCAST, filed Dec. 18, 2002, the entire contents of which are enclosed by reference herein.

FIELD OF THE INVENTION

The present invention relates generally to application broadcast and sharing, and more particularly to a method and system for broadcasting an application.

BACKGROUND OF THE INVENTION

Internet-related networks (e.g., the World Wide Web (Web)) may be used for application broadcast and sharing conferences. An application broadcast and sharing conference may consist, for example, of a conference moderator who may have a particular application (user-oriented, specific-function software) running on a digital processing system (DPS). The conference moderator may wish one or more conference participants, located at remote digital processing systems, to be aware of the moderator's interaction in regard to the application. Potentially, sharing an application may extend to allowing one or more participants to take control of the application from the moderator. Such application broadcast and sharing, via the Web, has increased dramatically in recent years.

Typically, application broadcast and sharing is accomplished by making the pixel data from the moderator's DPS available on a server DPS which transmits this data through the Internet to remotely locate participant (client) DPSs. The participant DPSs receives the data and causes the corresponding images to be displayed for the participant at the participant's DPS. Typically, the participant DPS is executing a streaming media playback software, such as Real Player from RealNetworks Inc. of Seattle, Wash. Streaming allows the data to be processed as a steady stream in real time. The presentation from the moderator's DPS is transmitted to the server on an on-going basis. For example, the system may periodically conduct a screen scrape. A screen scrape may be conducted by performing an exclusive OR (XOR) operation between the pixel data from the current screen and the pixel data from the last screen sent to the server. This XOR operation causes all the pixels that have not changed since the last screen scrape to become blackened, and the rest colored. The server keeps a queue of the screen scrapes, which is a history of what has changed on the moderator's DPS. To reduce the amount of data that must be stored on the server, the screen scrapes are compressed. For example, a run-length encoding (RLE) compression scheme may be used to compress the data. RLE compression provides a high rate of compression for situations such as this where there are large runs of identical values. The runs are compressed to the value, and a number indicating the length of its run.

The participant DPSs download data from the queue as fast as they are able based on the connection and processing capabilities (speeds) of the individual participant DPS. The streaming provides an animation effect, but may allow some participants to fall behind the rest of the conference if their connection and processing speeds are not adequate. Such systems take into account that the Internet is not an ideal medium for real time communication and therefore add buffering which helps to provide a coherent display. This buffering adds a delay of several seconds. Moreover, some current systems queue and create image buffers on a per user basis so that as more participants join a conference, it becomes more difficult for the server to manage the outgoing stream. That is, as the number of participant DPSs is increased, the hardware requirements for a given server DPS may become too great, requiring distribution through streamsplitting. Such systems may split the data stream among several servers to distribute the load to effect scalability. Each streamsplit adds latency to the system reducing the real time affect.

Such methods are inadequate for real time conferences in which a telephone system may be employed to describe the application. That is, as the moderator is describing the application over a telephone system, the participants should be viewing those aspects of the application to which the moderator is referring. Delays caused by buffering or scalability factors (e.g., streamsplitting) have a disconcerting effect upon the conference.

SUMMARY OF THE INVENTION

A method is described for application broadcasting. A display screen of a moderator digital processing system is divided into a plurality of tiles, the display screen containing a plurality of pixels, each tile containing a portion of the plurality of pixels. A display data segment corresponding to each tile is created using a bitmap of the tile stored in memory, each display data segment containing a pixel data of the corresponding tile. The display data segment is stored on a server digital processing system. Each tile is evaluated to determine if the pixel data of the tile has changed. An updated display data segment corresponding to each tile for which the pixel data has changed is created, each updated display data segment containing an updated pixel data of the corresponding tile. The updated display data segment is stored on the server digital processing system such that the corresponding stored display data segment is replaced.

Other features and advantages of the present invention will be apparent from the accompanying drawings, and from the detailed description, that follows below.

BRIEF DESCRIPTION OF THE DRAWINGS

The present invention is illustrated by way of example, and not limitation, by the figures of the accompanying drawings in which like references indicate similar elements and in which.

DETAILED DESCRIPTION

Methods and apparatuses are described for application broadcast and sharing. For one embodiment, pixel data being broadcast via the Internet from a moderator DPS to one or more participant DPSs is segmented into tiles. Display data is generated for each tile. Each display data segment (the display for each tile) contains the pixel data for the tile, which may be compressed, and also contains a tile identifier that may also indicate the tile's relative display screen position. The display data segments are periodically updated by determining, for each tile, whether the pixel data for that tile has changed. If so, the display data segment for the tile is replaced with the most recent display data segment corresponding to that tile. A time indicator is also included within each display data segment for each tile indicating the time at which the display data segment for that tile was updated (replaced). Only display data segments representing the current version of each tile are available on the server at any given time. A participant DPS requests data from the server and provides the time indicator for the last display data segment it received. The server then transmits the current display data segment for each tile that has been updated subsequently. This allows presentation at the participant's DPS of the most current version of the moderator's display screen.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Figure 1:
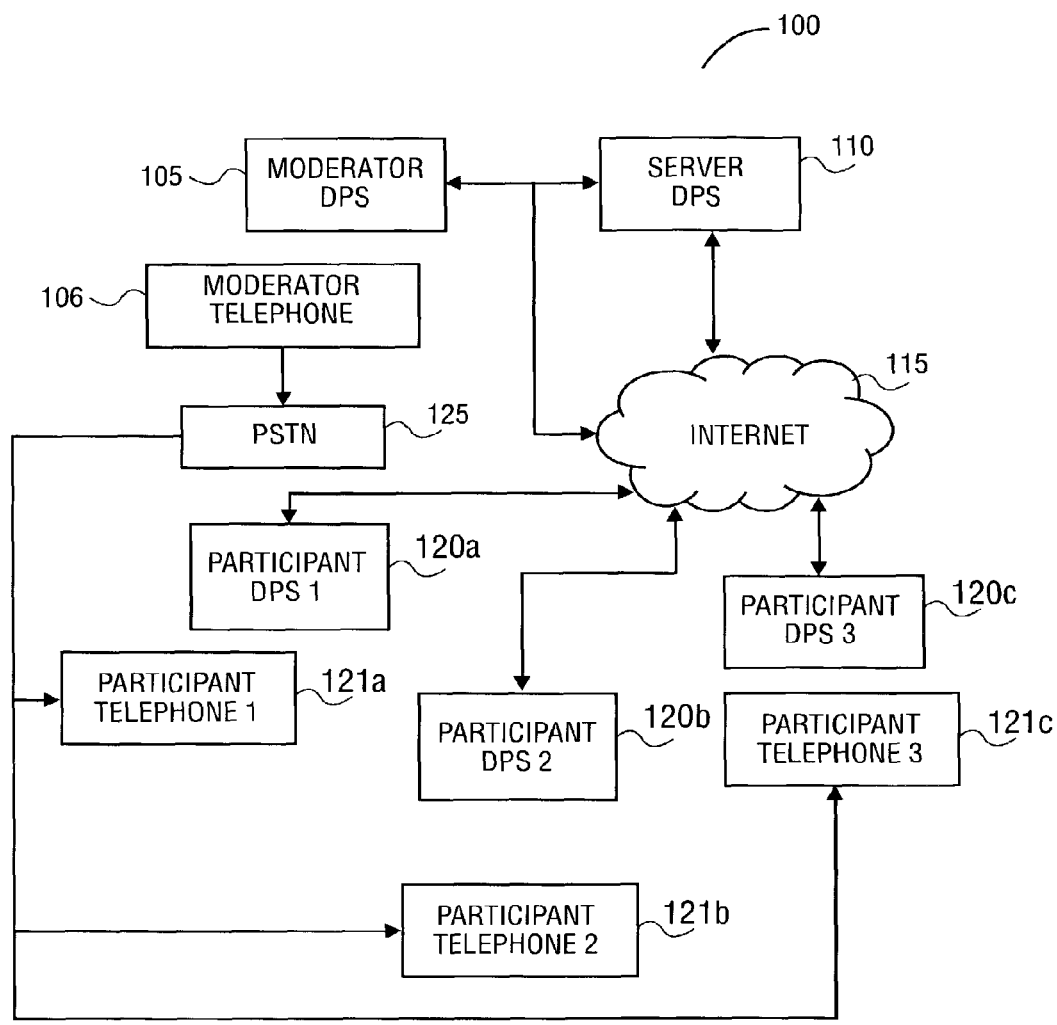
FIG. 1 is a system block diagram of an application broadcast and sharing conferencing system in accordance with one embodiment of the present invention.

FIG. 1 is a system block diagram of an application broadcast and sharing conferencing system in accordance with one embodiment of the present invention. System 100, shown in FIG. 1, includes a moderator DPS 105 and a server DPS 110, which are coupled, through Internet 115, to a plurality of local or remote participant DPSs 120a, 120b, and 120c. The Internet 115 is a network of networks through which information is exchanged by methods well known to those skilled in the art (e.g., the use of TCP and IP protocols, etc). Typically, the moderator DPS 105 would be presenting an application. The application could be any type of user-oriented, specific-function software, for example, a Windows application available from Microsoft Corporation of Redmond, Wash.

A display screen of the moderator DPS 105 is divided into a plurality of tiles. Each tile represents a specific segment of the display screen and corresponds to a specific portion of the display screen pixels. For one embodiment the tiles are configurable, fixed-length, rectangular, pixel blocks (e.g., 128 pixels by 32 pixels). The pixel data for each tile, which may be compressed, is stored on the server DPS 110 as a display data segment. This provides a representation of the moderator DPS 105 display screen data for access by each of the participant DPSs 120a, 120b, and 120c. An algorithm is employed to quickly discern if any of the pixels within a tile has changed, if so, the new pixel data for that tile is used to create a new display data segment that replaces the display data segment for that tile on the server. Thus, the display screen representation stored on the server DPS 110 is updated. The server DPS 110, at any given time, is storing only the current version of the pixel data for each tile and therefore is storing only one representation of the moderator DPS 105 display screen. The server DPS 110 is therefore not burdened with storing historical information regarding the display screen, and image buffers are not created for each participant. That is, the amount of memory used on the server DPS 110 is limited to that required to store the current display screen pixel data (i.e. display data segments for each tile) and is independent of the number of participants accessing the data. Thus, greater scalability is possible without introducing additional latency.

Included with the pixel data, in the display data segment for each tile, stored on the server DPS 110, is a time indicator (e.g., timestamp) that indicates the last time the display data segment was updated (i.e., the last time the pixel data for the tile changed). When a participant DPS accesses the data, the server accesses the last time stamp from that participant DPS which is stored on the server. The server DPS 110 then transmits only those display data segments having a later time indicator. However, a tile may be updated several times before the participant DPS has a chance to download the display data segments. In this way the participant DPS receives and processes only that data necessary to display the current version of the moderator DPS display screen.

Further details concerning the operation of moderator DPS 105, server DPS 110, and the participant DPSs 120a, 120b, and 120c are provided below.

System 100 also includes a moderator telephone 106 that may be co-located with the moderator DPS 105, and a plurality of participant telephones 121a, 121b, and 121c that may be co-located with the participant DPSs 120a, 120b, and 120c, respectively. The moderator's telephone 106 is coupled to each of the participant telephones 121a, 121b, and 121c through a telephone network. Telephone network is shown as public switched telephone network 125, but which may be, in alternative embodiments, any telecommunications network including any analog or digital (e.g., ISDN), wired, or wireless, telecommunications system, or VoIP. The moderator DPS 105 may typically, be controlled by a moderator of a conference. The moderator may also perhaps be talking about the application as it is being presented. Because the participant DPSs, 120a, 120b, and 120c, only access the most current representation of the display screen, the presentation at the participant DPSs will reflect the moderators comments being transmitted over the telephone network 125 without disconcerting latency.

Figure 2:
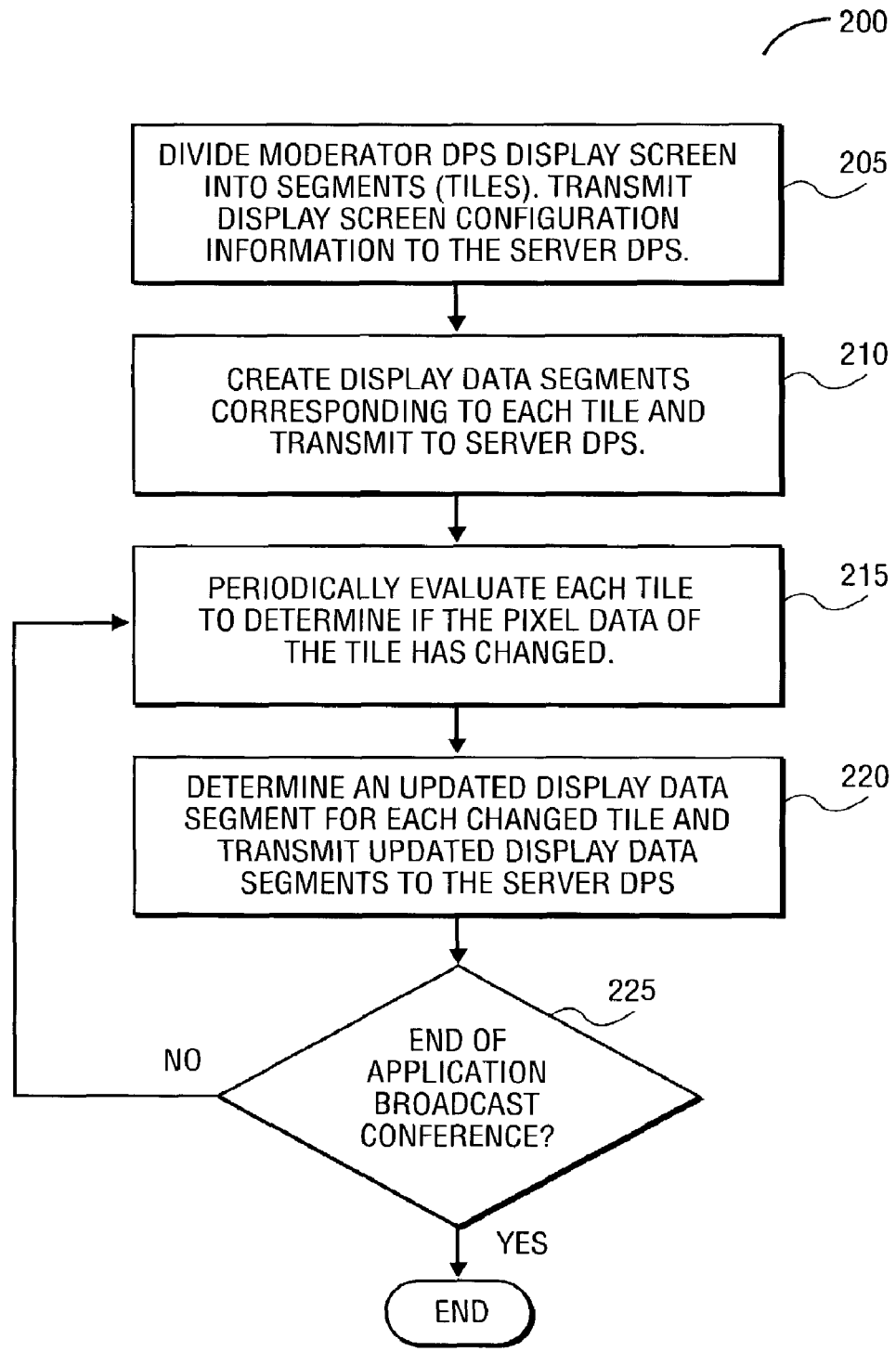
FIG. 2 is a process flow diagram of a method by which pixel data of a moderator DPS display screen is stored to a server and periodically updated.

FIG. 2 is a process flow diagram of a method by which pixel data of a moderator DPS display screen is stored to a server and periodically updated. The process 200, shown in FIG. 2, begins at operation 205 in which the display screen of the moderator DPS is divided into segments (tiles). The segmentation of the display screen may be done at the moderator DPS or may, in alternative embodiments, be done at the server DPS. For one embodiment, the moderator DPS display screen is segmented into rectangular tiles with dimensions of 128 pixels by 32 pixels. Typically, after the display screen is so divided, the tile configuration is not changed throughout the conference. Such a configuration results in a fixed coordinate system where each tile may be identified by its coordinates. For example, each tile may be uniquely identified by the x-y coordinate of the top left corner of the tile.

At operation 210, display data segments corresponding to each tile are created and transmitted to the server DPS and stored on the server DPS. Each display data segment contains the pixel data for the corresponding tile. The pixel data from each tile is compressed and stored as a corresponding display data segment together with the tile's unique identifier. Only one version of the tile is stored on the server at any given time. Each display data segment also includes a time indicator to indicate the last time at which the corresponding tile was changed (updated).

Figure 3:
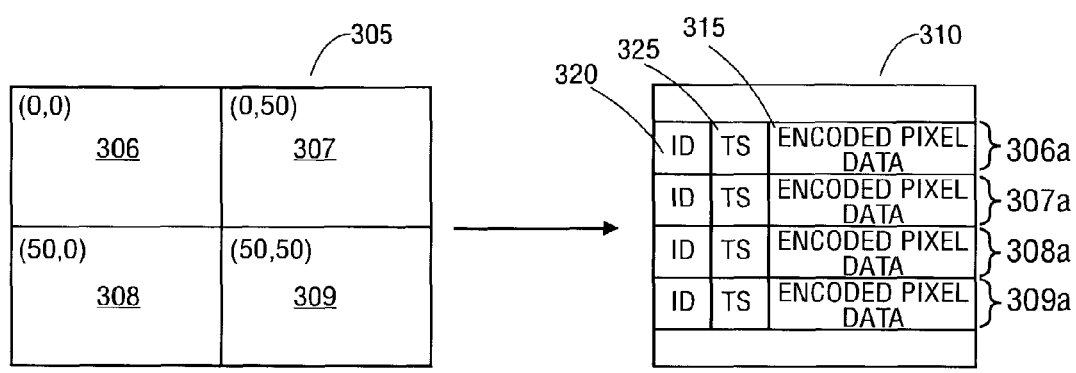
FIG. 3 illustrates a segmented moderator DPS display screen and the corresponding display data segments stored on the server in accordance with one embodiment of the present invention.

FIG. 3 illustrates a segmented moderator DPS display screen and the corresponding display data segments stored on the server in accordance with one embodiment of the present invention. The display screen 300, shown in FIG. 3, has been divided into four tiles 306-309. Each tile has been identified based upon its position on the display screen. For example, tiles 306-309 may be identified with the coordinate pairs (0,0), (0,50), (50,0), and (50,50), respectively. The particular identifiers are arbitrary and any system that uniquely identifies each tile may be employed. The pixel data for each tile is encoded (compressed) and transmitted to server 310. Server 310 contains a display data segment corresponding to each tile 306-309, namely 306a-309a. Each display data segment 306a-309a contains the encoded pixel data 315 and tile identifier 320 of the corresponding tile. Each display data segment 306a-309a also contains a time indicator 325 indicating the time at which the display data segment was created. Although display screen 300 is shown divided into four tiles, in practical embodiments, the display screen would be divided into many more, smaller, tiles. In such embodiments, the number of unique colors per tile is less than the number of colors on the screen, allowing for increased compression opportunities as described below.

Referring again to FIG. 2, at operation 215 each tile is periodically evaluated to determine if the pixel data of the tile has changed. For one embodiment, a processor, having a very fast memory compare routine (e.g., a multimedia extension (MMX) Pentium Processor available from Intel corporation of Santa Clara, Calif.) is used to compare each tile currently displayed on the moderator DPS display screen with the latest version of that tile stored on the server. That is, a bitmap of a tile as it currently appears on the screen, bitmapT.sub.0, is stored in memory. BitmapT.sub.0 is compared with the bitmap of the same tile used to create the corresponding display data segment stored on the server DPS, bitmapT.sub.−1, also stored in memory. Using the memory compare routine it is possible to quickly determine whether the two memory locations are equal or not. For one embodiment, the process of evaluating tiles to determine if a change has occurred is repeated on an on-going basis as often as the constraints of the moderator DPS will allow. Alternatively, the repetition frequency of the tile evaluation process may be based upon the connection and processing speed of the participant DPSs or other system criteria.

If bitmapT.sub.0 and bitmapT.sub.−1 are not equal, the tile is designated as a "changed tile" (i.e., the tile has been updated). At operation 220 an updated display data segment is determined for each changed tile. The updated display data segment contains pixel data corresponding to the current bitmap (bitmapT.sub.0) together with an updated time indicator. The tile identifier remains the same throughout the process. The new display data segment is transmitted to the server, and the server replaces the corresponding old display data segment with the new display data segment. The existing display data segment for a tile stored on the server is discarded when the tile is updated. The new display data segment representation of the tile stored on the server and hence the only representation of the tile available to participant DPSs.

At operation 225, if the conference has not ended, the process of evaluating tiles to determine if a change has occurred, determining new display data segments for changed tiles, and replacing old display data segments with the corresponding new display data segments continues.

As discussed above in reference to FIGS. 2 and 3, the pixel data for each tile is compressed prior to being stored on the server DPS. The pixel data may be compressed through any of several data compression schemes known in the art. The pixel data compression may take place at the moderator DPS or at the server DPS. For one embodiment, the pixel data compression is accomplished at the moderator DPS through a modified RLE compression scheme. Each tile represents a small portion of the display screen. For one embodiment, each tile represents a portion of the display screen that is 128 pixels long by 32 pixels wide. For this relatively small region, the number of colors that are likely to be displayed is much lower than the number of colors that are going to be displayed across the entire screen. For each tile, the number of colors required for the pixel data is between 16 and 64 colors. Therefore, even though the participant DPS display device may provide true color capability (each pixel represented by 24 bits), greater compression may be achieved by representing each pixel within a tile by only 1 byte (8 bits). Thus, for one embodiment of the present invention, a modified RLE encoding may be employed in which the pixels of a tile are encoded using only 1-byte. The 1-byte representation provides 256 colors, which is sufficient for the range of colors within a tile. Moreover, if the color range within a tile is significantly lower, then multiple pixels may be stored per byte. For example, if for a given tile, the color spread is only 16 colors, then only 4 bits are required to encode a pixel and two pixels may be encoded within each byte. This modified RLE encoding scheme is affected by determining the number of colors required to encode a tile and encoding the data as though the display device were set to that color-depth. That is, the color-depth for each tile is dynamically changed as the tile is being encoded. This results in increased compression over typical RLE encoding.

For one embodiment, compression may be further increased by doing a second pass compression of the data as it is queued on the network buffer. As described above, a tile that has changed is compressed and transmitted to the server. The system is able to identify and compress the tile faster than the data can be transmitted through the network.

Therefore, the updated display data segments are delayed in a network buffer queue on the moderator DPS. While this data is queued, it is possible to conduct a second compression on the outgoing data stream. Also, because tiles may be delayed in the queue, they may get replaced with subsequent updates before being transmitted.

The operations described above in reference to FIG. 2, and the data compression described above, may be implemented by hardware and/or software contained within the moderator DPS. For example, the moderator DPS may include one or more processors that can execute code or instructions stored within a machine-readable medium that may also be included within the moderator DPS as described in greater detail below in reference to FIG. 6.

Figure 4:
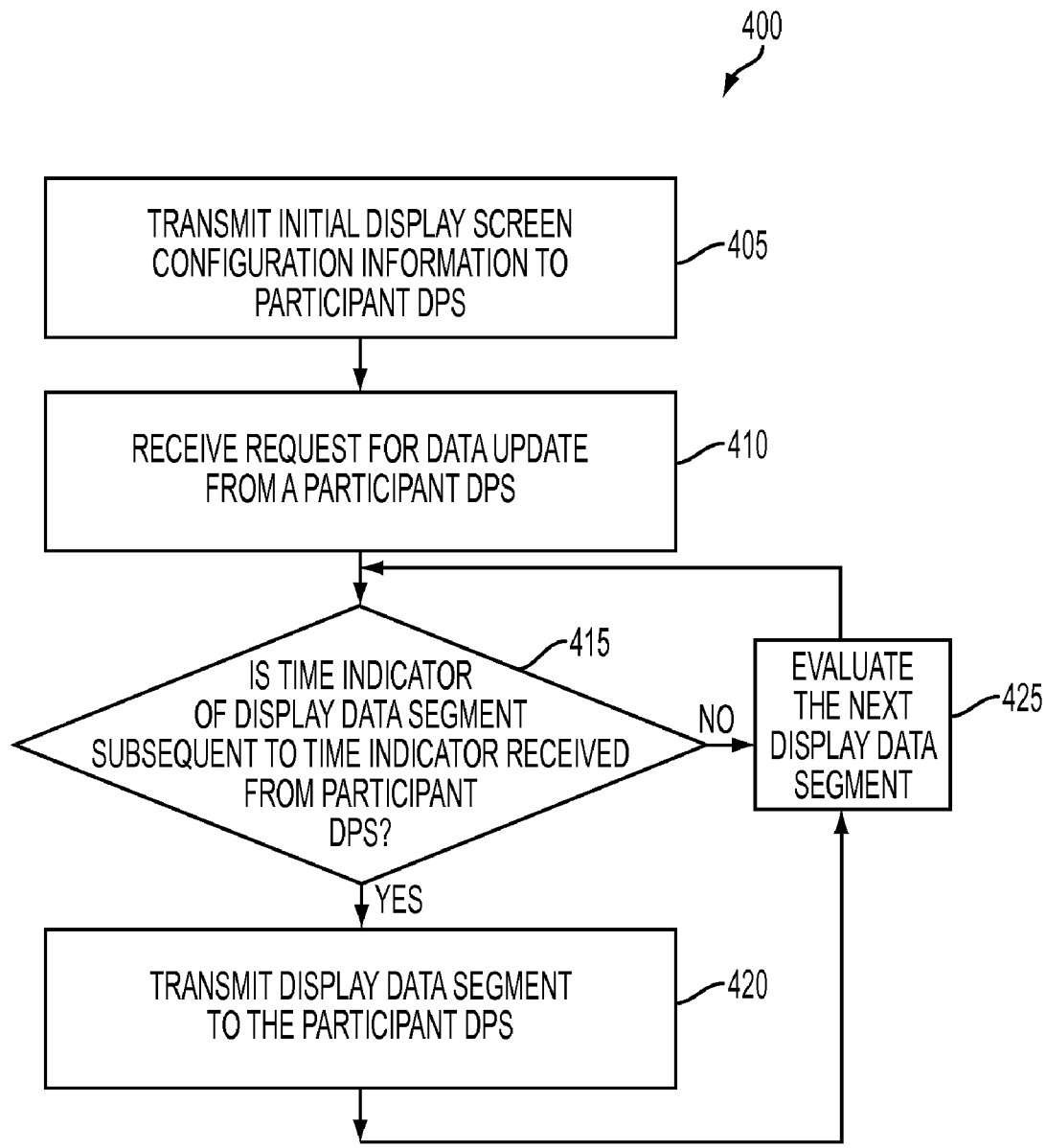
FIG. 4 is a process flow diagram of a method by which a server DPS transmits updated moderator DPS display screen data to a participant DPS, in accordance with one embodiment of the present invention.

FIG. 4 is a process flow diagram of a method by which a server DPS transmits updated moderator DPS display screen data to a participant DPS, in accordance with one embodiment of the present invention. Process 400, shown in FIG. 4, begins at operation 405 in which the server DPS transmits initial display screen configuration information to the participant DPS. The initial display screen configuration information determines the screen geometry and includes the tile size, and the unique identifier for each tile. The tile identifier may also indicate the tile's location on the screen and hence provide the screen geometry. At this time, the participant DPS may also receive an initial display data segment corresponding to each tile.

At operation 410 the participant DPS contacts the server DPS and requests a data update. Upon receiving the request, the server DPS accesses the last time indicator (e.g., timestamp) from the participant DPS which is stored on the server. The time indicator, indicates the time of the most recent display data segment received by the participant DPS, and, in effect, indicating to the server DPS that its version of the moderator DPS display screen was current as of a given time.

At operation 415 the server DPS compares the time indicator, stored for the participant on the server DPS, with the time indicator of each display data segment. To update the participant DPS, the server DPS need only transmit display data segments that have been replaced subsequent to the time indicated by the participant DPS time indicator.

If the display data segment for a particular tile has a time indicator that is subsequent to the time indicator stored for the participant DPS, this indicates that the corresponding tile has been changed since the last time the participant DPS accessed the display data segment. If the display data segment has a time indicator subsequent to the time indicator received from the participant DPS, the server DPS transmits that display data segment to the participant DPS at operation 420.

If the display data segment for a particular tile does not have a time indicator that is subsequent to the time indicator stored for the participant DPS, this indicates that the corresponding tile has not been changed since the last time the participant DPS accessed the display data segment. If the tile has not been changed since the last DPS access, the corresponding tile is not transmitted to the participant DPS.

At operation 425 the time indicator of another display data segment is compared to the time indicator stored for the participant DPS and the process is continued until all display data segments corresponding to each tile have been compared.

The server DPS may be able to determine display data segments having a time indicator subsequent to the time indicator stored for the participant DPS faster than such display data segments can be transmitted to the participant DPS. In such case, the display data segments maybe queued for transmission. The tile corresponding to a queued display data segment may be updated prior to transmission of the display data segment. If so, the server DPS may replace such a display data segment on the queue with the updated version of the display data segment. This ensures that the participant DPS receives the latest version of each tile, even if the tile has changed multiple times since the participant DPS initiated a request for a data update.

The operations described above in reference to FIG. 4 may be implemented by hardware and/or software contained within the server DPS. For example, the server DPS may include one or more processors that can execute code or instructions stored within a machine-readable medium that may also be included within the server DPS as described in greater detail below in reference to FIG. 6.

Figure 5:
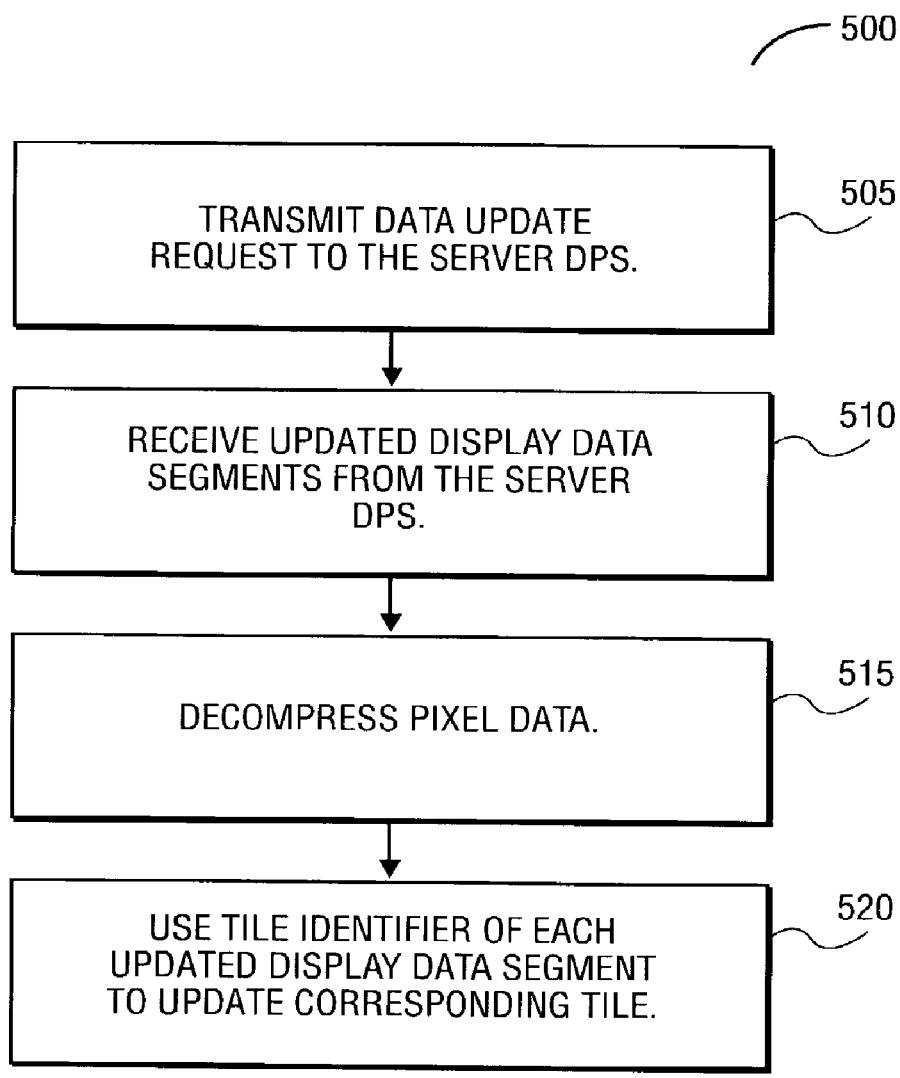
FIG. 5 is a process flow diagram of a method by which a participant DPS receives a current representation of the moderator DPS display screen in accordance with one embodiment of the present invention.

FIG. 5 is a process flow diagram of a method by which a participant DPS receives a current representation of the moderator DPS display screen in accordance with one embodiment of the present invention. The process 500, shown in FIG. 5, begins at operation 505 in which the participant DPS contacts the server and requests a data update.

At operation 510 the participant DPS receives the display data segments that have been updated subsequent to the most recent prior update. The display data segments include compressed pixel data for corresponding tiles as described above.

At operation 515, the compressed pixel data is decompressed based upon the compression scheme used to compress the data. For example, if the pixel data is compressed using a modified RLE compression scheme as described above, then the participant DPS uses a reverse RLE scheme and takes into account the color depth the data was encoded with. Once the pixel data of a display data segment is decoded the participant DPS has a representation of the changed tile corresponding to that display data segment.

At operation 520 the participant DPS uses the tile identifier, contained within the display data segment, to identify the corresponding tile on the participant DPS display screen and then uses the decompressed pixel data to update the participant DPS display screen. For example, for one embodiment the tile identifier is the x-y coordinate of a rectangular tile on the display screen. The participant DPS can thus identify to which tile the updated pixel data applies.

The operations described above in reference to FIG. 5, may be implemented by hardware and/or software contained within the participant DPS. For example, the participant DPS may include one or more processors that can execute code or instructions stored within a machine-readable medium that may also be included within the participant DPS as described below in greater detail below in reference to FIG. 6.

Figure 6:
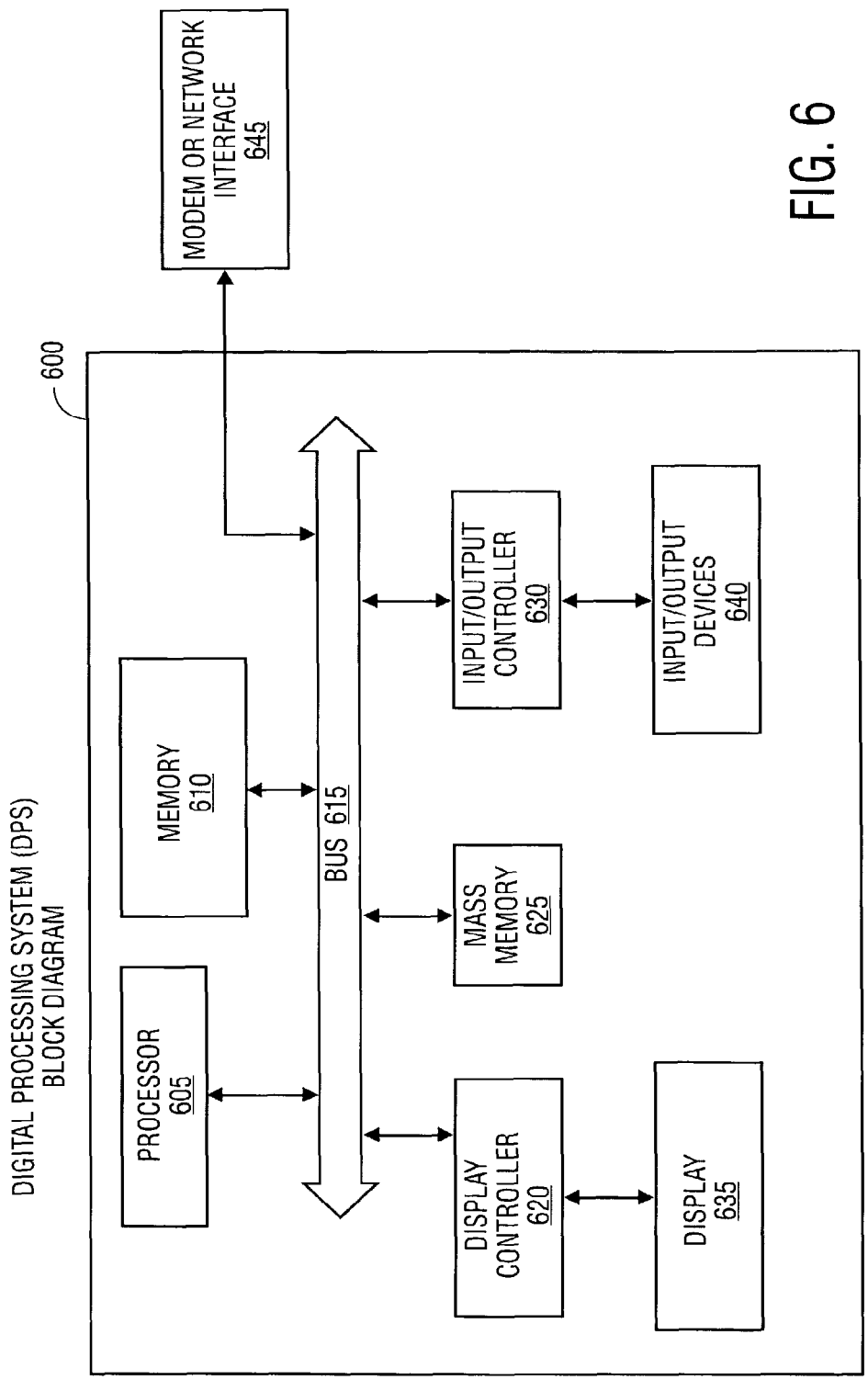
FIG. 6 is a block diagram of a DPS that may be used in accordance with one embodiment of the present invention.

FIG. 6 is a block diagram of a DPS that may be used in accordance with one embodiment of the present invention. For example, the DPS 600 shown in FIG. 6 may be used as a participant DPS, or a Moderator DPS, or a server DPS, etc. Furthermore, the DPS 600 may be used to perform one or more functions of an Internet service provider. The DPS 600 may be interfaced to external systems through a modem or network interface 645. The modem or network interface may be considered a part of the DPS 600. The modem or network interface may be an analog modem, an ISDN modem, a cable modem, a token ring interface, a satellite transmission interface, a wireless interface, or other interface(s) for providing a data communication link between two or more DPSs.

The DPS 600 includes a processor 605, which may represent one or more processors and may include one or more conventional types of processors, such as Motorola PowerPC processor (available from Motorola, Inc. of Schaumburg, Ill.), an Intel MMX Pentium processor (available from Intel Corporation of Santa Clara, Calif.), etc. A memory 610 is coupled to the processor 605 by a bus 615. The memory 610 may be a dynamic random access memory (DRAM) and/or may include static RAM (SRAM). The processor 605 may also be coupled to other types of storage areas/memories (e.g., cache, Flash memory, disk, etc.), which could be considered as part of the memory 610 or separate from the memory 610.

The bus 615 further couples the processor 605 to a display controller 620, a mass memory 625, the modem or network interface 645, and an input/output (I/O) controller 630.

The operations described above in reference to FIGS. 2, 4, and 5 may be implemented by software stored on mass memory 625 depending on the particular DPS and system configuration. For example, the operations of dividing the moderator DPS display screen into tiles, creating a display data segment corresponding to each tile, determining if the pixel data for a tile has changed, and creating an updated display data segment corresponding to tiles that have changed, may be implemented by software stored upon mass memory 625 of a moderator DPS. The operation of comparing the time indicator of a data request with the time indicator of each display data segment and transmitting only display data segments having a subsequent time indicator may be implemented by software stored upon a mass memory 625 of a server DPS. And the operations of requesting and receiving updated display date segments, decompressing the pixel data of each updated display data segment, and using each tile identifier to apply the updated data to the corresponding display screen tile may be implemented by software stored upon a mass memory 625 of a participant DPS.

The mass memory 625 may represent a magnetic, optical, magneto-optical, tape, and/or other type of machine-readable medium/device for storing information. For example, the mass memory 625 may represent a hard disk, a read-only or writeable optical CD, etc. The display controller 620 controls, in a conventional manner, a display 635, which may represent a cathode ray tube (CRT) display, a liquid crystal display (LCD), a plasma display, or other type of display device. The I/O controller 630 controls I/O device(s) 640, which may include one or more keyboards, mouse/track ball or other pointing devices, magnetic and/or optical disk drives, printers, scanners, digital cameras, microphones, etc.

The DPS 600 represents only one example of a system, which may have many different configurations and architectures and which may be employed with the present invention. For example, Macintosh and Intel systems often have multiple buses, such as a peripheral bus, a dedicated cache bus, etc. On the other hand, a network computer, which may be used as a DPS of the present invention, may not include, for example, a hard disk or other mass storage device, but may receive routines and/or data from a network connection, such as the modem or interface 645, to be processed by the processor 605. Similarly, a Web TV system, which is known in the art, may be considered to be a DPS of the present invention, but such a system may not include one or more I/O devices, such as those described above with reference to I/O device 640. Additionally, a portable communication and data processing system, which may employ a cellular telephone and/or paging capabilities, may be considered a DPS that may be used with the present invention.

In the system 600 shown in FIG. 6, the mass memory 625 (and/or the memory 610) may store media (e.g., applications, video, etc.) that may be processed according to the present invention. Alternatively, media data may be received by the DPS 600, for example, via the modem or network interface 645, and stored and/or presented by the display 635 and/or the I/O device(s) 640. In one embodiment, data may be transmitted across a data communication network, such as a LAN and/or the Internet.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
   transmitting display data to a participant digital processing system, the display data comprises a plurality of tiles, each tile represents a segment of the display data, each display data segment comprises pixel data that represents a portion of a plurality of pixels of a display screen of a moderator digital processing system and a time indicator indicating when the display data segment was created, wherein each of the tiles is periodically evaluated to determine whether any of the pixels within any of the tiles has changed and, when any of the pixels within any of the tiles changes, a new pixel data for that tile is used to create a new display data segment that replaces the display data segment for that tile on a server;
   receiving a request for a display data update from a participant digital processing system;
   accessing an update time indicator indicating the time of a previous transmission of display data;
   determining display data segments having a time indicator subsequent to the update time indicator; and
   transmitting the display data segments having a time indicator subsequent to the update time indicator to the participant digital processing system.

2. The method of claim 1, wherein the display data further includes configuration information determining a screen geometry, the screen geometry including a tile size and a unique identifier for each tile.

3. The method of claim 2, wherein the tile size is 128 pixels long by 32 pixels wide and the unique identifier for each tile indicates the location of the tile on the display screen of the moderator digital processing system.

4. A non-transitory machine-readable storage medium that provides instructions, which when executed by a digital processing system, causes a processor to perform:
   transmitting display data to a participant digital processing system, the display data comprises a plurality of tiles, each tile represents a segment of the display data, each display data segment comprises pixel data that represents a portion of a plurality of pixels of a display screen of a moderator digital processing system and a time indicator indicating when the display data segment was created, wherein each of the tiles is periodically evaluated to determine whether any of the pixels within any of the tiles has changed and, when any of the pixels within any of the tiles changes, a new pixel data for that tile is used to create a new display data segment that replaces the display data segment for that tile on a server;
   receiving a request for a display data update from a participant digital processing system;
   accessing an update time indicator indicating the time of a previous transmission of display data;
   determining display data segments having a time indicator subsequent to the update time indicator; and
   transmitting the display data segments having a time indicator subsequent to the update time indicator to the participant digital processing system.

5. The non-transitory machine-readable storage medium of claim 4, wherein the display data further includes configuration information determining a screen geometry, the screen geometry including a tile size and a unique identifier for each tile.

6. The non-transitory machine-readable storage medium of claim 5, wherein the tile size is 128 pixels long by 32 pixels wide and the unique identifier for each tile indicates the location of the tile on the display screen of the moderator digital processing system.

7. An apparatus for transmitting display data, comprising:
   means for transmitting the display data to a participant digital processing system, the display data comprises a plurality of tiles, each tile represents a segment of the display data, each display data segment comprises pixel data that represents a portion of a plurality of pixels of a display screen of a moderator digital processing system and a time indicator indicating when the display data segment was created, wherein each of the tiles is periodically evaluated to determine whether any of the pixels within any of the tiles has changed and, when any of the pixels within any of the tiles changes, a new pixel data for that tile is used to create a new display data segment that replaces the display data segment for that tile on a server;
   means for receiving a request for a display data update from a participant digital processing system;

means for accessing an update time indicator indicating the time of a previous transmission of display data;

means for determining display data segments having a time indicator subsequent to the update time indicator; and means for transmitting the display data segments having a time indicator subsequent to the update time indicator to the participant digital processing system.

8. The apparatus of claim 7, wherein the display data further includes configuration information determining a screen geometry, the screen geometry including a tile size and a unique identifier for each tile.

9. The apparatus of claim 8, wherein the tile size is 128 pixels long by 32 pixels wide and the unique identifier for each tile indicates the location of the tile on the display screen of the moderator digital processing system.

10. A method, comprising:
requesting a display data update from a server digital processing system; and
receiving, at a participant digital processing system, display data, the display data comprises a plurality of tiles that represents a segment of the display data, each display data segment has a time indicator to indicate when the display data segment was created, each time indicator is subsequent to an update time indicator, the update time indicator indicates the time of a previous transmission of display data, each display data segment comprises pixel data that represents a portion of pixels of a display screen of a moderator digital processing system, wherein each of the tiles is periodically evaluated to determine whether any of the pixels within any of the tiles has changed and, when any of the pixels within any of the tiles changes, a new pixel data for that tile is used to create a new display data segment that replaces the display data segment for that tile on the server.

11. The method of claim 10, wherein pixels of the display screen of a participant digital processing system are divided into a plurality of portions, each portion corresponding to a portion of pixels of a display screen of a moderator digital processing system, such that the pixel data of a display data segment corresponding to a portion of pixels of the display screen of the moderator digital processing system is used to update the corresponding portion of pixels of the display screen of the participant digital processing system.

12. A non-transitory machine-readable storage medium that provides instructions, which when executed by a digital processing system, cause said set of processors causes a processor to perform a method comprising:
requesting a display data update from a server digital processing system; and
receiving, at a participant digital processing system, display data, the display data comprises a plurality of tiles, each tile represents a segment of the display data, each display data segment has a time indicator to indicate when the display data segment was created, each time indicator is subsequent to an update time indicator, the update time indicator indicates the time of a previous transmission of the display data, each display data segment comprises pixel data that represents a portion of pixels of a display screen of a moderator digital processing system, wherein each of the tiles is periodically evaluated to determine whether any of the pixels within any of the tiles has changed and, when any of the pixels within any of the tiles changes, a new pixel data for that tile is used to create a new display data segment that replaces the display data segment for that tile on a server.

13. The non-transitory machine-readable storage medium of claim 12, wherein pixels of the display screen of a participant digital processing system are divided into a plurality of portions, each portion corresponding to a portion of pixels of a display screen of a moderator digital processing system, such that the pixel data of a display data segment corresponding to a portion of pixels of the display screen of the moderator digital processing system is used to update the corresponding portion of pixels of the display screen of the participant digital processing system.

14. An apparatus for receiving a display data update comprising:
a transmitter configured to request a display data update from a server digital processing system; and
a receiver configured to receive, at a participant digital processing system, display data, the display data comprises a plurality of tiles, each tile represents a segment of display data, each display data segment has a time indicator to indicate when the display data segment was created, each time indicator is subsequent to an update time indicator, the update time indicator indicates the time of a previous transmission of the display data, each display data segment comprises pixel data that represents a portion of pixels of a display screen of a moderator digital processing system, wherein each of the tiles is periodically evaluated to determine whether any of the pixels within any of the tiles has changed and, when any of the pixels within any of the tiles change, a new pixel data for that tile is used to create a new display data segment that replaces the display data segment for that tile on the server.

15. The apparatus of claim 14, wherein pixels of the display screen of a participant digital processing system are divided into a plurality of portions, each portion corresponding to a portion of pixels of a display screen of a moderator digital processing system, such that the pixel data of a display data segment corresponding to a portion of pixels of the display screen of the moderator digital processing system is used to update the corresponding portion of pixels of the display screen of the participant digital processing system.

16. A system comprising:
a moderator digital processing system (MDPS);
the MDPS storing a plurality of display data segments on a server digital processing system, each display data segment comprises pixel data that represents a corresponding portion of pixels of a display screen of the moderator digital processing system, such that each portion of pixels is periodically evaluated to determine if the pixel data for the portion of pixels has changed, and each data segment is updated when the pixel data for the corresponding portion of pixels change; and
at least one participant digital processing system coupled to the server digital processing system capable of periodically accessing the plurality of display data segments stored on the server processing system and downloading each data segment that has been updated subsequent to a most recently downloaded display data segment wherein each of the tiles is periodically evaluated to determine whether any of the pixels within any of the tiles has changed and, if any of the pixels within a tile has changed, a new pixel data for that tile is used to create a new display data segment that replaces the display data segment for that tile on the server.

17. The system of claim 16, wherein each display data segment further includes a time indicator indicating an update time and the at least one participant digital processing system accesses the plurality of display data segments by transmitting an access request to the server digital processing system, such that for each access request, the server digital processing system compares a time indicator indicating an update time of a most recently downloaded display data segment with the update time for each display data segment, and transmits only those display data segments having an update time subsequent to the update time of the most recently downloaded display data segment.

18. The system of claim 17, wherein the at least one participant digital processing system is remote from the moderator digital processing system and is coupled thereto through an internet.

19. The system of claim 18, wherein periodically evaluating each portion of pixels to determine if the pixel data for the portion of pixels has changed comprises:
  storing a current bitmap of a portion of pixels to memory; and
  using a memory compare routine to compare the current bitmap of the portion of pixels with a bitmap of the portion of pixels used to create the display data segment.

* * * * *